United States Patent [19]

Burrington et al.

[11] Patent Number: 4,459,141

[45] Date of Patent: Jul. 10, 1984

[54] AIR CLEANING DEVICE

[75] Inventors: Richard C. Burrington, Crystal; William J. Campbell, Minneapolis; Ross T. Petersen, Plymouth, all of Minn.

[73] Assignee: Medalie Manufacturing Company, Minneapolis, Minn.

[21] Appl. No.: 455,101

[22] Filed: Jan. 3, 1983

[51] Int. Cl.³ ............................................. B01D 50/00
[52] U.S. Cl. ....................................... 55/391; 55/317; 55/318; 55/396; 55/404; 55/426; 55/430; 55/457; 55/461
[58] Field of Search ................................. 55/317–319, 55/327, 391, 396–399, 404, 430, 431, 449, 450, 457, 461, 426

[56] References Cited

U.S. PATENT DOCUMENTS

| | | | |
|---|---|---|---|
| 429,347 | 6/1890 | Haskell | 55/450 |
| 2,586,243 | 2/1952 | McDougall | 55/398 |
| 3,374,857 | 3/1968 | Hutchins | 55/396 |
| 3,757,751 | 9/1973 | Kitchin | 123/119 |
| 3,973,937 | 8/1976 | Petersen | 55/449 |
| 3,987,862 | 10/1976 | Lidstone | 180/54 |
| 4,013,137 | 3/1977 | Petersen | 180/69 |
| 4,014,673 | 3/1977 | Kinnison | 55/398 |
| 4,015,958 | 4/1977 | Leschonski et al. | 55/457 |
| 4,201,557 | 5/1980 | Petersen | 55/327 |
| 4,285,707 | 8/1981 | Pfenninger | 55/404 |
| 4,373,940 | 2/1983 | Petersen | 55/398 |

*Primary Examiner*—David L. Lacey
*Attorney, Agent, or Firm*—Leo Gregory

[57] ABSTRACT

An air cleaning device for use in connection with clean air usage such as with internal combustion engines or to provide cleaned air for ventilation purposes, the air cleaner device comprising a directional hood having a substantially unrestricted air intake and a short throat directional separation chamber into which incoming air is drawn and in which incoming contaminants and moisture are centrifuged by a multiplicity of directional vanes onto and along an adjacent baffle member leading to an annular discharge chamber through which a driven spinner assembly ejects contaminants and moisture through rearward facing ports and creating a relatively low to high pressure gradient into and through the discharge chamber with the pressure gradient increasing to accelerate the movement of the contaminants and moisture through the discharge chamber and through the discharge ports with the pressure of ejection being greater than the external ambient air pressure.

2 Claims, 6 Drawing Figures

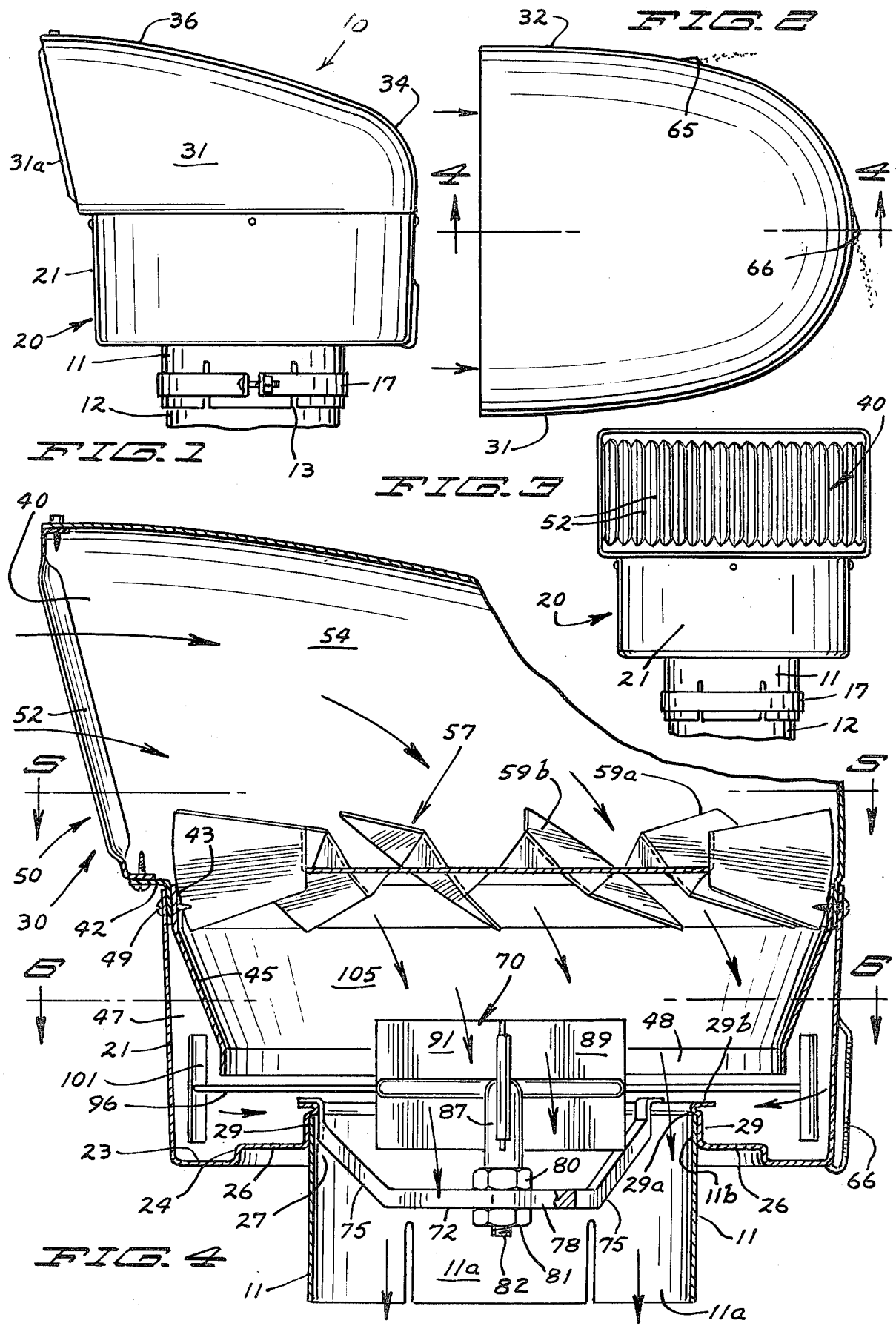

AIR CLEANING DEVICE

BACKGROUND OF THE INVENTION

1. Field of Invention

This invention relates to an air cleaning device.

2. Description of the Prior Art

The device herein relates to a directional air cleaning device to provide air for clean air usage and the embodiment thereof described herein is adapted to be mounted upon the stack of an air inlet such as of an internal combustion engine or of a compressor and the like.

Directional hoods are known in the prior art. However, such devices tend to have restrictive screened air inlets which are subject to clogging. Such devices also have not combined a capability to separate both contaminants and moisture from the intake air stream along with the partial recovery of the energy of the moving air due to the directional orientation of the hood.

The structure of the device disclosed herein is particularly arranged to provide a substantially non-clogging air inlet, a relatively wide area throat portion permitting free movement of air through the separation chamber and providing for centrifuging the air stream flowing through and the discharge of contaminants and moisture therefrom in a downstream wind direction combined with the partial recovery of the energy of the moving air.

SUMMARY OF THE INVENTION

This invention relates to an air cleaning device such as to be mounted upon the air inlet passage leading to the air intake of the proposed use of the cleaned air such as for consumption by an internal combustion engine, an air compressor or as for ventilation purposes.

It is an object herein to provide an air cleaning device arranged and constructed to be relatively free of restriction for the passage of air thereinto and through the air cleaning chamber therein.

It is another object herein to provide an air cleaning device having an annular exhaust chamber having downstream exhaust ports and providing a relatively low gradient pressure into and a higher pressure gradient out of the exhaust or discharge chamber which accelerates the passage of contaminants and moisture into and through the chamber.

It is a further object to provide an annular exhaust arrangement which effectively prevents the passage of contaminants and moisture into the clean air inlet passage.

It is also an object herein to provide a cap member in connection with the exhaust arrangement which prevents the passage of contaminants or moisture into the clean air inlet and diverts incoming air into centrifuging vanes.

More specifically it is an object herein to provide an air cleaner having a substantially restriction free air inlet, a wide area short throated structure to pass the incoming air through centrifuging vanes onto and along a baffle member having a downwardly reducing transverse dimension which tends to accelerate the passage of air therethrough and reduces the critical radial separation distance for contaminants and moisture and divert the same into a discharge passage having downstream discharge ports and providing for confinement of turbulence which may result from such passage.

These and other objects and advantages of the invention will be set forth in the following description made in connection with the accompanying drawings in which like reference characters refer to similar parts throughout the several views.

BRIEF DESCRIPTION OF THE DRAWINGS

FIGS. 1 and 2 are views in side elevation and top plan respectively;

FIG. 3 is a front elevational view;

FIG. 4 is a view in vertical section taken on line 4—4 of FIG. 2 as indicated;

DESCRIPTION OF A PREFERRED EMBODIMENT

Figure 5:
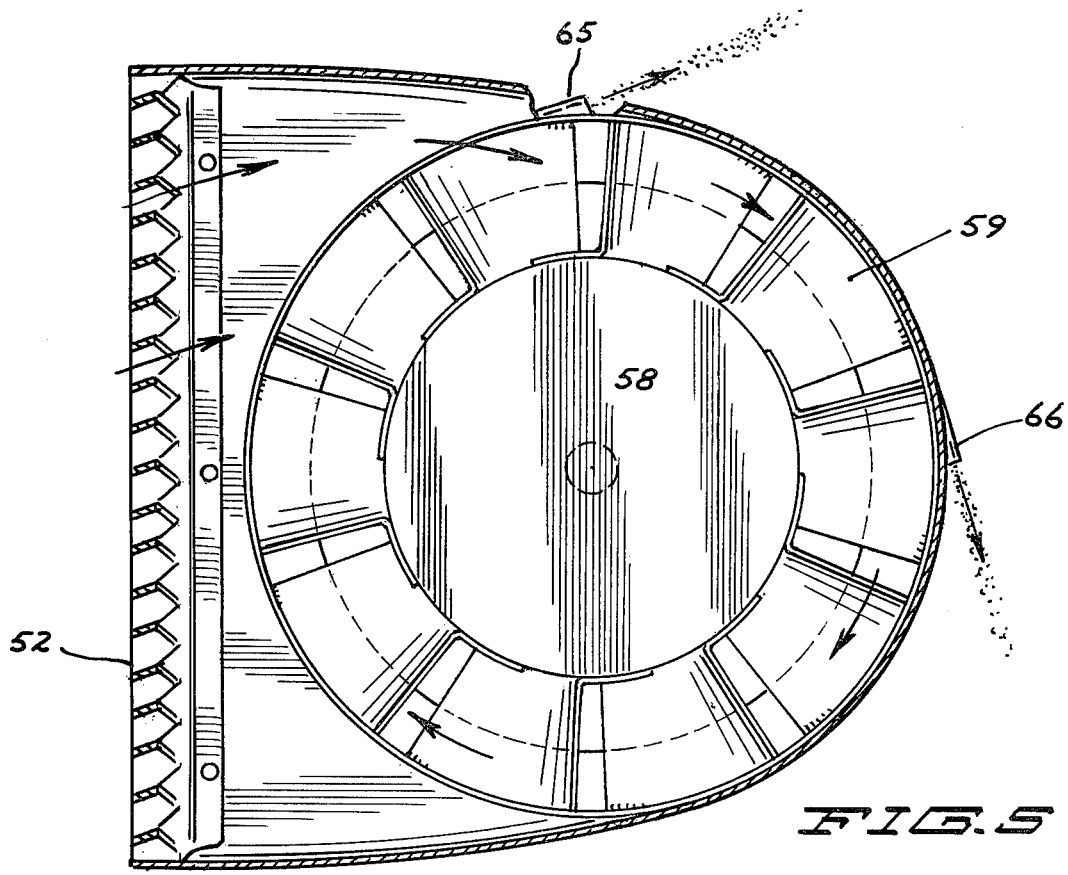
FIG. 5 is a view in horizontal section taken on line 5—5 of FIG. 4 as indicated.

The invention herein comprising an air cleaning device is indicated generally by the reference numeral 10. The embodiment described herein for purpose of illustration relates particularly to the device for use to provide relatively clean air to an internal combustion engine. The device will be understood to have a more general application for clean air usage.

The embodiment of the invention described herein is shown being mounted by means of a sleeve or inlet pipe 11 upon a stack 12, said sleeve is shown having circumferentially spaced vertical slots 13 for diametrical adjustment and a conventional type of clamp 17 secures said sleeve. Said stack is the air intake pipe of an internal combustion engine and which by way of concept may represent the air inlet for any proposed use of cleaned air.

The device herein comprises a cylindrical housing body portion 20 having an annular side wall 21 forming a relatively short wide throat having an inwardly turned bottom wall 23 formed as a channel and having the inner side of said channel upturned to form a boundary wall 24 of short height, the same extending horizontally to form a fairly wide annular flange 26. Said flange terminates in an upturned wall 29 having at its top a small radial outward projection forming a shoulder 29a and said projection being turned inward horizontally to form an annular flange 29b.

Said annular flange 26 forms therein a circular opening 27 which receives therethrough said sleeve 11. An upper portion 11b of said sleeve extends above said opening to abut or engage said shoulder 29a for a sealing engagement therewith. Said sleeve is suitably secured to the adjacent portions of said wall 29.

The passage 11a through said sleeve 11 forms the clean air inlet into the air intake stack 12.

Mounted upon said housing 20 is a hood 30. Said hood is of unitary construction formed to have side walls 31 and 32, a back wall 34 and a top wall 36.

As shown, said hood is fairly squat having formed in said front wall a substantially full height and full width inlet opening 40, said inlet opening having a width greater than the width of said body 20 and is here shown to be substantially rectangular in front elevation having an upward forward slope as indicated by the leading edge 31a of the side wall 31. Said side walls taper and curve downwardly rearwardly to form the back wall 34 which conforms downwardly to the adjacent transverse curvature of said body portion 20.

Said top wall 36 extends from said front opening sloping downwardly rearwardly to merge with said side walls 31 and 32 in forming the back wall. A short bottom wall 42 is formed under the front opening 40, which bottom wall and the adjacent depending portions of said side walls and rear wall are formed into a short sleeve 43 which is slipped or disposed within the upper portion of said annular side wall 21. Said sleeve in effect extends downwardly tapered inwardly to define a frustrum forming a deflection member or baffle 45. Said baffle has a vertical annular depending portion 48 spaced radially outwardly of said flange 29b.

On the downstream side of said housing 20 with the hood facing into the incoming air stream, there are formed in the side wall 21 by a punched out projecting offset, vertical slots 65 and 66 forming exhaust or discharge ports in the downstream direction of the passing windstream and compatible with normal air flow and spinner rotation within said device.

Said ports extend down to and somewhat into the channel 23 in the bottom of the discharge passage. Formed in said channel 23 diametrically opposed to said slots 65 and 66 are drains or drain holes 67 and 68. Thus there will be no residue build-up within said channel.

Said baffle or deflection member 45 and its depending portion 48 taken with said side wall 21, the channel member 23 and the ports 65, 66 and the drain holes 67 and 68 defines a discharge passage 47.

Said depending sleeve 43 of said hood and baffle 45 are suitably removably secured to the upper edge portion of said side wall 21 as by metal screws 49.

Disposed within said inlet opening 40 and suitably secured to the wall edges thereabout as by metal screws is a louvered member 50 comprised of full inlet height vertical louvers 52 which are angled in horizontal section sufficiently to form effective deflective surfaces to cause spinning motion of the incoming air stream.

The area confined by said hood 30 forms the air inlet chamber 54.

Overlying said baffle 45 in vertically spaced relation is a circular deflection member 57 stamped out of a single piece of metal and consisting of a central or core portion 58 forming a bonnet which serves as a barrier to prevent the central vertical or axial passage of contaminants and moisture (hereinafter collectively referred to as material) and spaced about the periphery thereof are vanes 59 which are in substantially a parallel relation with each other as indicated at 59a and 59b, said vanes being angled on the order of 35° from the horizontal and are tilted or pitched outwardly to deflect material away from said inlet passage 11a and toward and onto the surface of said baffle 45 and from there said material passes into the discharge passage 47 for discharge through the ports 65 and 66. The depending baffle member 45 and its depending vertical wall portion 48 extend downwardly sufficiently to avoid any tendency for discharged materials to enter said clean air passage 11a.

Said vanes 59 are suitably welded to the adjacent surface portions of said sleeve 43.

Figure 6:
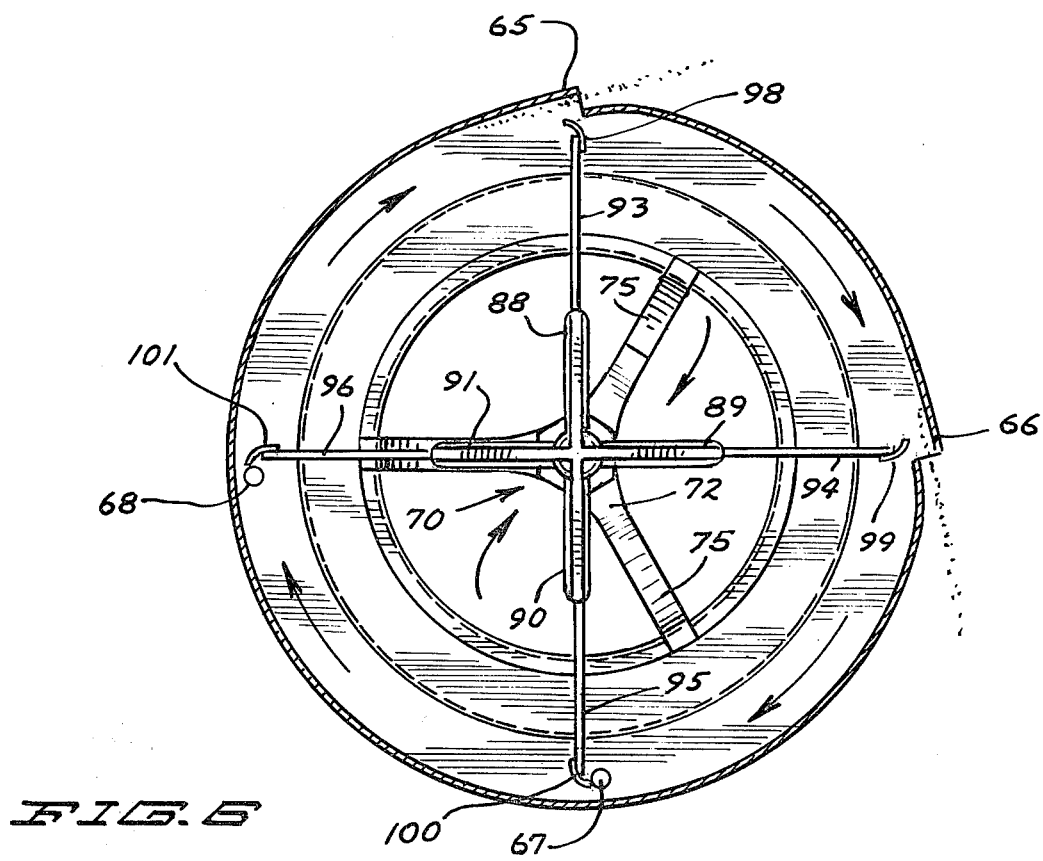
FIG. 6 is a view in horizontal section taken on line 6—6 of FIG. 4 as indicated.

Mounted within the upper portion or throat of said sleeve 11 is a spinner assembly 70. The mounting within the specific embodiment here illustrated comprises a spider 72 having upwardly angled arms 75 which here are three in number, the same being suitably secured as by welding to the upper adjacent portions of said sleeve 11 and flange 29b. The base 78 of said spider has mounted thereon an upstanding shaft 82 secured by lock nuts 80 and 81 disposed above and below said base. Journaled onto said shaft in a suitable manner is a hub 87 which has disposed thereabout at spaced intervals, such as at 90° intervals, upright substantially rectangular blades indicated at 88–91. Extending outwardly of said blades are arms 93–96 in the form of rods and carried at the ends thereof are vertically disposed blade members 98–101 shown here to be rectangular in form having in the present embodiment convex forward facing surfaces shown by the blade 99 in FIG. 6.

Said arms are of such length that said blades are positioned to be driven through a path through the discharge passage 47 in close proximity to the adjacent surface of said side wall 21 and said ports 65 and 66. Said arms are positioned vertically to just clear the planar surface of said flange 29b.

The angled arms of said spider serve to form stops in seating said sleeve upon a stack 12 thus accommodating stacks of various sized diameters or throats. Said sleeve in view of its vertical slots is readily drawn up by a clamp member onto a stack and it may be expanded if required.

In accommodating as a stop member various sized stacks, said spider foreshortens the height of the entire structure and particularly of the separation chamber 105 formed within the body 30. Said spider further provides for the positioning of the spinner assembly in a very effective operating position relative to the discharge passage 47. Thus there results a relatively short passage for the incoming air stream both as to having material separated therefrom and having cleaned air pass into the clean air passage 11a.

A salient element in the structure of said hood is the full width of the inlet 40 and the vertically louvered screen disposed therein. The wide expanse of the inlet chamber 54 coupled with the relatively short length of the separation or baffle chamber 105 provides a relatively unrestricted passage for the inlet air stream to be processed for passage into said air inlet 11a of said sleeve 11.

The incoming air upon passing through the louvered screen 50 is immediately deflected to become a rotary stream and is drawn directly through the pitched or angled vanes 59 into a curvilinear spin and is thrust onto and along the baffle member 45. The baffle member in having a downwardly reducing diameter accelerates the incoming air stream as it passes downwardly of the baffle or separation chamber 105. The centrifuged portion of the air stream is guided to pass into the discharge passage 47.

The spinner assembly driven by the suction upon the incoming air stream with its forwardly facing convexely curved blades 98–101 drives the centrifuged portion of the incoming air stream and the material therein onto the adjacent surface of the wall 21 and through the ports 65 and 66.

The inlet chamber 54 and the separation chamber 105 are of such an expanse that there is a gradual directional change of the incoming air stream through a 90° path which avoids restriction and allows a partial recovery and use of the energy of the moving air when the hood is directed to face into a moving air stream.

The material in the incoming air stream by its inertial energy is thrust upon the inner back wall of the hood and thence down into the discharge passage aided by air flow and gravitational forces.

The baffle 45 confines to the discharge passage 47 any turbulence caused by the action of the spinner assembly, preventing any backwash of turbulence from entering the separation chamber 105.

There is an increase in pressure gradient in the travel of incoming air from the inner diameter or area of entrance into said discharge passage in the direction of discharge of material therefrom. There is in effect a suction of air into said discharge passage between the bottom of the baffle 45 and the adjacent edge of the flange 29*b*. This flange deters material from being deflected out into the cleaned air inlet passage 11*a*.

The blades 98–101 in the discharge passage are caused to rotate at such a rate that material is forcefully discharged through.

The device in operation preferably will be faced into the incoming air stream of the forward motion of the vehicle to receive the energy or force of such incoming air stream. The vertical louvers very successfully avoid becoming congested by air borne particles by eliminating horizontal surfaces, intersections, and broad faces perpendicular to the air flow on which congestion can form.

The device herein has proved to be very efficient in handling and cleaning relatively large volumes of air.

The device is readily separated for repair or maintenance. The hood and screen are both removed by removal of sheet metal screws, the vane structure is lifted off with it which in turn exposes the entire spinner assembly.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. An air cleaning device, having in combination a housing having a annular side wall and a bottom wall, said bottom wall having a central opening having an upstanding wall thereabout and an annular chamber formed in said bottom wall, a directional hood mounted upon and connected to said housing, said hood having a relatively large inlet, a louvered member positioned in said inlet, the louvers of said member being angled to deflect and cause a spinning motion of an incoming air stream, a vane assembly disposed within said housing thereacross underlying said hood, said vane assembly comprising a plate member having vanes formed about the periphery thereof and being angular to the horizontal and substantially parallel with each other to deflect downwardly contaminants carried by an incoming air stream, an annular baffle member secured within said housing underlying said vane assembly and defining a particle separation chamber, a sleeve extending upwardly through said opening in said bottom wall and being secured to said bottom wall, a spider member comprising a base portion mounted within said sleeve and having upwardly angled arms secured to said upstanding wall, a hub journaled onto said base portion, a plurality of spaced blade members supported by said hub, said blade members having extensions thereof having plate members at the ends thereof, said baffle member positioned and arranged to define a confined discharge passage with the adjacent side wall and bottom wall of said housing, said upstanding wall being positioned and arranged to form a barrier confining said discharge passage, said extensions having such a length that said plate members extend through said discharge passage, and slot discharge ports formed in said side wall of said housing and being positioned to discharge contaminants downstream of a passing windstream.

2. The device of claim 1, including drain ports extending through said bottom wall of said housing.

* * * * *